US011807997B2

(12) United States Patent
Nagel et al.

(10) Patent No.: US 11,807,997 B2
(45) Date of Patent: Nov. 7, 2023

(54) SYSTEMS AND METHODS OF VISUAL GUIDANCE

(71) Applicant: Caterpillar Paving Products Inc., Brooklyn Park, MN (US)

(72) Inventors: Brian D. Nagel, Ramsey, MN (US); David E. Gerding, Maple Grove, MN (US); Travis D. McClung, Las Vegas, NV (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 191 days.

(21) Appl. No.: 17/318,073

(22) Filed: May 12, 2021

(65) Prior Publication Data
US 2022/0364316 A1  Nov. 17, 2022

(51) Int. Cl.
*E01C 19/00* (2006.01)
*B60Q 9/00* (2006.01)
*F21V 23/00* (2015.01)
*E01C 19/28* (2006.01)
*F21W 131/403* (2006.01)

(52) U.S. Cl.
CPC ............. *E01C 19/008* (2013.01); *B60Q 9/00* (2013.01); *E01C 19/004* (2013.01); *E01C 19/282* (2013.01); *F21V 23/003* (2013.01); *F21W 2131/403* (2013.01)

(58) Field of Classification Search
CPC .... E01C 19/004; E01C 19/008; E01C 19/282; B60Q 9/00; F21W 2131/403
USPC ................. 404/72, 75, 84.05–84.5, 117, 118
See application file for complete search history.

(56) References Cited

U.S. PATENT DOCUMENTS

| | | | | |
|---|---|---|---|---|
| 5,052,854 A | * | 10/1991 | Correa | E01C 23/163 404/94 |
| 5,664,909 A | * | 9/1997 | Lindgren | E01C 19/26 180/326 |
| 5,698,259 A | * | 12/1997 | Collinucci | G05D 1/0289 427/136 |

(Continued)

FOREIGN PATENT DOCUMENTS

| | | |
|---|---|---|
| DE | 10240227 B4 | 4/2006 |
| DE | 202006020026 U1 | 10/2007 |

(Continued)

*Primary Examiner* — Raymond W Addie
(74) *Attorney, Agent, or Firm* — Leydig, Voit & Mayer, LTD.

(57) ABSTRACT

A method includes performing, with a compacting machine, a first pass to compact a first portion of a work area to compact a first lane. A guidance system acquires position information representing the first compacted lane. A second pass is performed to compact a second portion of the work area adjacent the first portion. The guidance system acquires current position information of the machine representing current positioning of the machine during the second pass. Comparing the position information of the machine representing the first compacted lane with the current position information, determines whether the current positioning overlaps the first compacted lane a specified amount. When the second pass is determined to overlap the first compacted lane, in-compliance visual indicia is generated. When the second pass is determined to not overlap the first compacted lane with the specified amount, out of compliance visual indicia is generated.

19 Claims, 4 Drawing Sheets

(56) References Cited

U.S. PATENT DOCUMENTS

| | | | |
|---|---|---|---|
| 6,198,386 B1* | 3/2001 | White, II | H04N 7/181 |
| | | | 348/E7.086 |
| 6,287,048 B1* | 9/2001 | Hollon | E01C 19/264 |
| | | | 404/84.2 |
| 10,354,228 B2 | 7/2019 | Paulsen et al. | |
| 10,392,756 B2 | 8/2019 | Dolinar et al. | |
| 10,433,386 B2 | 10/2019 | Quinlan | |
| 10,710,857 B2 | 7/2020 | Luminet et al. | |
| 2003/0226290 A1* | 12/2003 | Savard | G05B 19/401 |
| | | | 37/348 |
| 2008/0063473 A1* | 3/2008 | Congdon | E01C 19/288 |
| | | | 404/75 |
| 2010/0215434 A1* | 8/2010 | Wolf | E01C 19/288 |
| | | | 404/117 |
| 2013/0082161 A1* | 4/2013 | Eul | E01C 19/48 |
| | | | 362/546 |
| 2016/0054283 A1* | 2/2016 | Stromsoe | E01C 19/236 |
| | | | 73/488 |
| 2017/0160094 A1* | 6/2017 | Zhang | B60R 11/00 |
| 2019/0119865 A1* | 4/2019 | Weber | E01C 19/008 |
| 2020/0033146 A1* | 1/2020 | Cash | G01S 19/51 |
| 2020/0057444 A1 | 2/2020 | Fritz et al. | |
| 2020/0332480 A1* | 10/2020 | Ries | E01C 23/127 |

FOREIGN PATENT DOCUMENTS

| | | |
|---|---|---|
| DE | 102015115242 A1 | 3/2017 |
| DE | 102019204790 A1 | 10/2020 |

* cited by examiner

SYSTEMS AND METHODS OF VISUAL GUIDANCE

TECHNICAL FIELD

This disclosure relates generally to systems and methods of providing visual guidance to an operator of a machine.

BACKGROUND

The operation and use of machinery, such as heavy construction machinery, is an expensive undertaking. How to increase the efficiency, effectiveness, and safe operation of heavy machinery has been an increasingly central focus for machine manufacturers and contractors.

In one example, related to the compaction of soil or other surfaces with compaction machines, proper compaction of the surface requires that an area undergoing compaction overlaps a previously compacted work area or lane. Overlap occurs when at least some of the compaction drum of the machine overlaps with a previously compacted work lane. Typically, the overlap is about six to twelve inches.

It can be difficult for an operator to determine if the compaction machine is compacting a work area with the proper overlap to a previously compacted work area for a number of reasons. It is common practice for relatively inexperienced operators to be given the responsibility of operating compaction machines before they are permitted to operate larger or more complicated machinery. This practice can produce uneven results from the simple lack of operator experience. Perhaps more critically, it is often not possible, from the operator's position on the machine, to see or determine the contact point of the compaction machine roller with the ground, and therefore it is not possible to visually confirm that the roller is positioned to produce the specified overlap to produce a properly compacted soil or surface.

To address the inability to visually confirm the position of the machine, some contractors add a reference mark or marks to the machine, like a piece of tape or a ribbon, which the operator can reference and can use to direct the machine to produce the specified overlap by aligning the mark to the physical edge of a previously compacted work area. However, the reference mark is person-specific, being related to the operator's physical size and position in the machine and cannot reliably be used by all operators. Thus, different reference marks would be required for each operator.

The process for determining the proper place for a reference mark is surprisingly complicated and consumes valuable time. In one example, an operator makes a first pass up in a first compaction lane of a work area. The operator reverses back down the lane to make a second pass in the first compaction lane. An assistant on the ground then directs the operator to align the machine drum for a first pass on a second compaction lane with the proper overlap for the specified task. Once the drum is lined up, the assistant moves their hand along the bumper of the machine until the operator confirms that the assistants hand is lined up with the mark of the first compaction lane. The assistant then places the tape or ties the ribbon at the position of the hand. As the operator continues to compact additional lanes, the operator need only line up the reference mark on the front bumper to the previous compaction lane mark to produce the specified overlap assuming that the operator maintains a consistent position in the machine.

As noted above, the above method of providing visual guidance has disadvantages, notably that it requires the knowledge of how to execute the method, two people are needed to perform the necessary steps, the method must be done for front and rear operating directions, and once created the reference markings are only valid for a given operator. There is a need for a system and method for producing visual guidance to an operator of machinery and the present disclosure satisfies the need.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, the disclosure is directed to a method of operating a compacting machine on a work area. The method includes performing, with the compacting machine, a first pass to compact a first portion of the work area. On the first pass a first compacted lane is compacted. A guidance system acquires position information of the machine representing the first compacted lane. A second pass is performed to compact a second portion of the work area adjacent the first portion. The guidance system acquires current position information of the machine representing current positioning of the machine during the second pass. By comparing the position information of the machine representing the first compacted lane with the current position information, whether the current positioning overlaps the first compacted lane a specified amount is determined. When the second pass is determined to overlap the first compacted lane with the specified amount, a visual indicia is generated of an in-compliance condition. When the second pass is determined to not overlap the first compacted lane with the specified amount, a visual indicia is generated of an out of compliance condition.

In another aspect, the disclosure is directed to a compacting machine configured to compact a material on a surface. The compacting machine includes a frame. A compacting member is mounted to the frame. The compacting member is configured to compact the material to produce a compacted area. A projector is arranged on the frame, wherein the projector configured to generate position indicia during operation of the machine, the position indicia indicative of a work area currently being compacted by the compacting member.

In yet another aspect, the disclosure is directed to a machine including an implement configured to complete a task, wherein the implement is not directly observable by an operator during operation of the machine. A guidance system is configured to project visual indicia corresponding to the location of the implement, wherein the visual indicia is observable by the operator during operation of the machine, and wherein the visual indicia is indicative of an in-compliance condition or an out of compliance condition of the implement.

DETAILED DESCRIPTION

Figure 1:
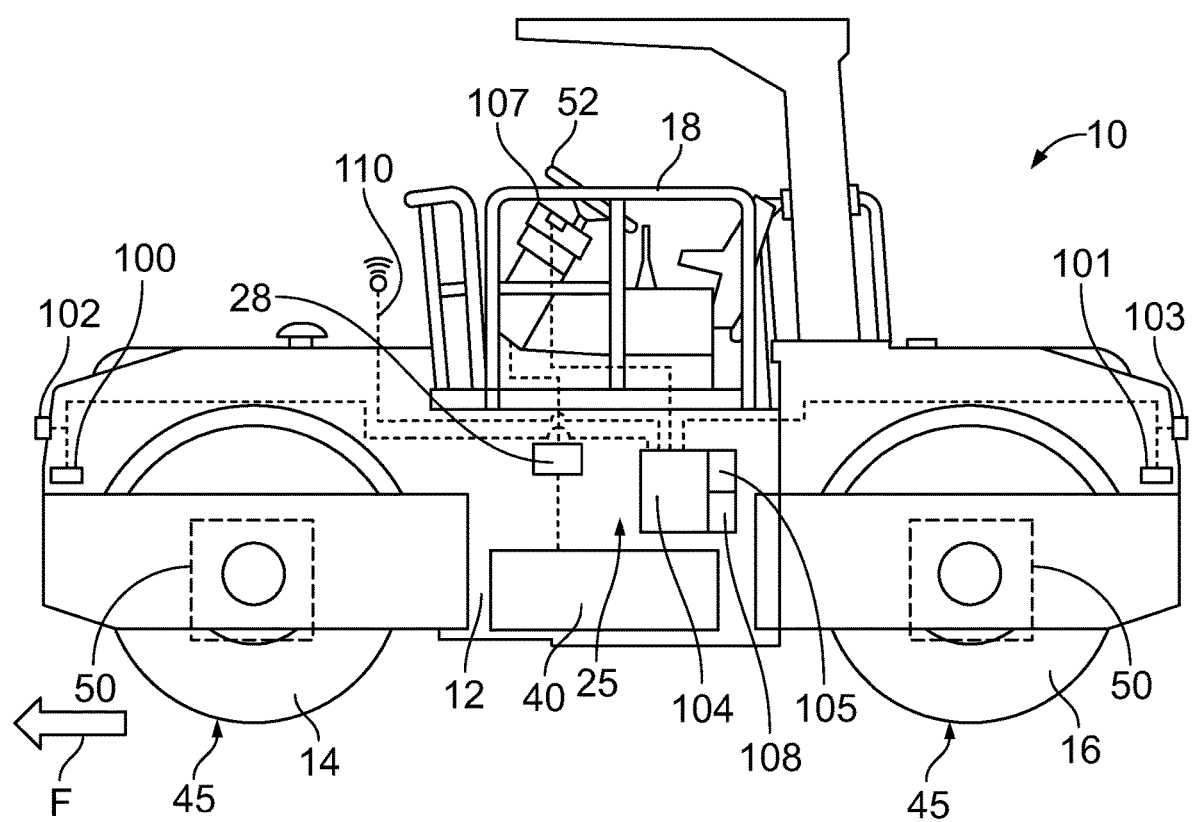
FIG. 1 is a side view of a machine with a guidance system according to the disclosure.

Now referring to the drawings, wherein like elements refer to like reference numbers, there is illustrated in FIG. 1 an exemplary embodiment of a machine 10 constructed according to principles of the present disclosure which includes an embodiment of a system for supplying visual guidance to an operator of the machine. In the illustrated embodiment, the machine 10 is in the form of a vibratory compactor machine. It will be understood that the guidance system of the present disclosure may be applied to any machine where it would be useful to provide visual guidance to an operator with respect to spatial positioning of the machine or parts of the machine during operation. For context, the forward direction is indicated, via the arrow F, in the figure.

The compacting machine 10 can be used in situations where loose surface material, characterized as material which can be further packed or densified, is disposed over the surface. As the compacting machine 10 travels over the surface, vibrational forces generated by the compacting machine 10 imparted to the surface, acting in cooperation with the weight of the compacting machine 10, cause compression of the loose material to a state of greater compaction and density. The compacting machine 10 may make one or more passes over the surface to provide a desired level of compaction. In one application, the loose material can be freshly-deposited asphalt that is to be compacted into roadways or similar hardtop surfaces. However, in other applications, the material may be soil, gravel, sand, landfill trash, concrete, combinations thereof, or other material capable of being compacted. To achieve proper preparation of the surface to a specified consistency, all areas of the surface should be compacted, with no areas of the surface omitted. Furthermore, the systems and methods disclosed herein may also permit optimal positioning of the machine to maximize efficient operation thereof.

In other embodiments, the principles disclosed herein can be incorporated and used with other suitable machines. In other embodiments, the compacting machine 10 can have different forms, such as any other compacting machine known to those skilled in the art including soil compactors, asphalt compactors, utility compactors, pneumatic compactors, vibratory compactors, self-propelled two-wheel and four-wheel compactors, for example. For example, in embodiments, the compactor machine comprises a compactor machine having one or more roller drums that are in rolling contact with a surface to be compacted. In embodiments, the compacting machine 10 includes a single compacting member.

In other examples, the present disclosure may be applied to loaders, graders, earth moving machines, farming machinery, and other machines where visual guidance would enhance the effectiveness of an operator of the machine enabling the operator to determine or confirm the position of the machine relative to a work piece, a work area, or another machine, a desired position of the machine or components of the machine such as a tool of the machine, and similar applications. In yet other examples, the present disclosure may be applied to operations that require movement of a machine over an area in order to produce a specified condition of the area in a specified and/or efficient manner.

In the most general form, the present disclosure includes a system that provides to an operator of a machine visual indicia that indicates a positional parameter of the machine. The indicia may be lighting that indicates a current position of the machine or a functional tool part of the machine such that the operator can determine if the machine or tool part is properly positioned. Embodiments of such systems and methods of operating a machine with such a system are disclosed herein.

Turning to the illustrated example, compacting machine 10 illustrated in FIG. 1 includes a frame 12, first and second tools in the form of front and rear compacting members 14, 16, an operator compartment 18, an embodiment of a guidance system 25 constructed according to principles of the present disclosure, and an optional control module 28.

The frame 12 includes structural members of the compacting machine 10 that can be used to support other systems of the compacting machine 10 that enable the compacting machine 10 to function. In embodiments, the frame 12 can have any suitable configuration as will be appreciated by one skilled in the art.

To propel the compacting machine 10 over the surface, a power system, such as an engine 40, can also be mounted to the frame 12 and can be configured to generate power to move the compacting machine 10. One or more tools or implements (not shown) may be connected to the machine 10. Such implements can be used for a variety of tasks, including, for example, loading, lifting, and brushing, and may include, for example, buckets, forked lifting devices, brushes, grapples, cutters, shears, blades, breakers/hammers, augers, and any other implement known in the art.

Each of the first and second compacting members 14, 16 is mounted to the frame 12. Each of the first and second compacting members 14, 16 has a ground-engaging surface 45. The first and second compacting members 14, 16 are configured to compact the material over which the compacting machine 10 is propelled. In embodiments, to transfer motive power from the engine 40 to the surface upon which the first and second compacting members 14, 16 are resting, the engine 40 can operatively drive and rotate only the first compacting member 14, only the second compacting member 16, or both the first and second compacting members 14, 16, through an appropriate power train. It will be understood that because of the location of the ground-engaging surface 45 relative to the position of an operator in the operator compartment 18, the operator cannot directly monitor the position of the ground-engaging surface. It will also be readily apparent that many machines have components that can assume or occupy positions that are not directly visible to an operator of the machine.

In the illustrated embodiment, each of the first and second compacting members 14, 16 comprises a drum rotatably mounted to the frame 12. Both of the first and second compacting members 14, 16 are rotatably coupled to frame 12 so that the first and second compacting members 14, 16 are in rolling contact with the surface material as the compacting machine 10 travels over the material being compacted.

It will be appreciated that, in embodiments, the first compacting member 14 can have the same or different construction as the second compacting member 16. In the illustrated embodiment, the first and second compacting members 14, 16 have the same construction comprising an elongated, hollow cylinder with a cylindrical drum shell that encloses an interior volume. The cylindrical roller drum extends along and defines a cylindrical drum axis. To withstand being in rolling contact with and compacting the surface material, the drum shell can be made from a thick, rigid material such as cast iron or steel in embodiments.

In other embodiments, the compacting member can have a different construction, such as a rubber tire, for example. In embodiments, the compacting machine 10 can include a single roller drum and rubber tires (not shown) configured to contact the material being compacted.

Both the first compacting member 14 and the second compacting member 16 can have a vibratory mechanism 50 associated therewith. While FIG. 1 shows both the first and second compacting members 14, 16 being associated with vibratory mechanisms 50, in other embodiments, only one of the first and second compacting members 14, 16 has the vibratory mechanism 50. In still other embodiments, a single vibratory mechanism 50 or multiple vibratory mechanisms 50 can be located at different locations on the compacting machine 10. In embodiments, the vibratory mechanism 50 can have any suitable construction, as will be appreciated by one skilled in the art. In embodiments, the vibratory mechanism 50 can comprise a variable vibratory mechanism that is configured to impart a range of different vibrations. Other machines 10 suitable for use with the guidance system 25 of the present disclosure operate without any vibratory mechanism.

The compacting machine 10 is adapted to be controlled by an operator. The operator compartment 18 is supported by the frame 12 and is configured to hold one or more operators therein during operation of the compacting machine 10. As shown in FIG. 1, the operator compartment 18 is mounted on top of the frame 12, from which an operator may control and direct operation of the compacting machine 10. Additionally, operator controls 52 including a steering wheel, a forward/reverse propel lever, and other controls can be located within the operator compartment 18, including for example, controls for positioning tools or work implements.

Referring to FIG. 1, the compacting machine 10 includes an embodiment of a guidance system 25 constructed according to principles of the present disclosure. The system 25 is configured to present visual indicia to the operator that may indicate at least the present position of the machines compacting members 14, 16. In other embodiments, the system 25 is configured to present visual indicia to the operator that additionally presents an area previously compacted, or operated upon, by the machine. In one embodiment, the visual indicia includes light projected by the system upon the work surface, which in one example, may be the ground. Other alternative embodiments will be detailed herein.

The guidance system 25 is supported by the frame 12. The illustrated guidance system 25 includes first and second light projectors 100, 101, positioned on the machine 10, each respectively associated with the ground-engaging surface 45 of one of the first and second compacting members 14, 16, a controller 104 in communication with the light projectors, a non-transitory computer-readable medium 105 in communication with the controller, an interface device 107 positioned to be visually accessed by an operator, a data storage device 108 in communication with the controller and the non-transitory computer-readable medium, and an optional communication device 110 in communication with the controller. The first light projector 100 and the second light projector 101 may each be a pair of spaced projectors or may each be a single component.

The first and second projectors 100, 101 are mounted to the frame 12 or any suitable part of the machine 10 such that light generated by the projectors is projected respectively generally forward and rearward. For example, the first and second projectors 100, 101 may be attached to bumpers of the machine or the machine cab.

The first and second projectors 100, 101 are configured to generate lighting indicative of the width of the compacting members in a direction defined by the physical orientation of the machine and projected onto the ground or the work surface. In other words, when the machine 10 is traveling in a given direction, the first projector 100 produces one or more lighted indicia onto the ground parallel to the given direction in the forward direction. The indicia may be a spaced-apart pattern that is of the same width as the first compacting member 14. Similarly, the second projector 101 produces one or more lighted indicia onto the ground parallel to the given direction. The indicia may be in a spaced-apart pattern that is of the same width as the second compacting member 16 in the reverse direction. Accordingly, the operator, by viewing the projected indicia, can see precisely what area is to be worked when operating the machine when the machine is moved in the given direction. The first and second projectors 100, 101 may each be a single lighting unit or a pair of spaced units, for example, projecting light generated by LEDs or the like.

In another embodiment, third and fourth projectors 102, 103 provide additional functionality to that provided by the first and second projectors 100, 101. The third projector 102 may be configured similarly to the first projector 100 and the fourth projector 102 may be configured similarly to the second projector 101 to project generally forward and rearward respectively. As will be described hereinbelow, the third and fourth projectors 102, 103 are in communication with the guidance system controller 104 and, when activated, project light in a position on the ground or the work surface to indicate a work area or work lane that has previously been compacted or otherwise previously worked. The third and fourth projectors 102, 103 may each be a single lighting unit or a pair of spaced units, for example, projecting light generated by LEDs or the like.

Briefly, in an embodiment, the operator can view and compare the positions of the indicia generated by projectors 100 and 102 when operating in a forward direction of travel to determine how the area being compacted or worked relates to the previous work area. While operating the machine in a rearward direction of travel the operator can view and compare the positions of the indicia generated by the projectors 101 and optionally also 103 to determine how the area being compacted or worked relates to the previous work area. With respect to compacting operations, it is desirable to overlap the area being compacted or worked with the previous work area a distance that ensures consistent compacting of the surface, for example about six inches, without so much overlap that efficiency is reduced significantly.

The controller 104 is in communication with the first and second projectors 100, 101 to operate the projectors. In one embodiment, the controller 104 may activate only the first projector 100 when the controller detects that controls 52 of the machine 10 are causing the machine to operate in a forward direction. The controller 104 may activate only the second projector 101 when the controller detects that controls 52 of the machine 10 are causing the machine to operate in a reverse direction. This feature also provides an indication to personnel in the area not operating the machine which direction that the machine is moving or will be moving, providing an additional safety feature to the system 25. In one embodiment, the first and second projectors 100, 101 are fixed to the machine 10 and configured to project indicia that indicates where the compacting members 14, 16 will cause compaction of the surface. As above, the controller 104 is in communication with the third and fourth projectors 102, 103 and is configured to operate the projectors.

An optional interface device 107 may be mounted within the operator compartment 18. The interface device 107 is in communication with the controller 104. The interface device 107 is configured to produce an indicia additional to that provided by the projectors 100, 101, 102, 103 or as an alternative to one or more of the projectors. For example, the controller 104 can activate the interface device 107 to provide an indication to the operator that the machine 10 is being operated properly, in a current work area relative to a previously worked area, or improperly. The indication could be a simple display generating a lighted alert color, or the indication could be an alert with addition information, such as which direction the machine 10 the operator should move the machine to come into compliance in the form of a directional arrow, for example.

The data storage device 108 is in communication with the controller 104. The data storage device 108 is configured to store therein data used by the controller 104. In one embodiment, the data storage device 108 may be configured to store position data as a map, which is accessible by the controller 104 to determine whether the machine 10 is being operated in compliance or out of compliance and control the direction of the projectors 102 or 103 and/or interface 107 to project indicia and/or an indication of whether the machine is being operated in our out of compliance and/or what corrective action is required to be taken. In the context of the present example, an in-compliance status would correspond to operation of the compacting machine with the specified amount of overlap to an adjacent previously compacted work lane.

The controller 104 or control module 28 of the machine 10 can include a suitable geolocation unit configured to receive a location signal indicative of a current location of the compacting machine 10. In embodiments, the geolocation unit can comprise any suitable device configured to acquire data related to and determine the location of the compacting machine 10. The module 28 may be configured to record and store the location signal indicative of an absolute location (including, e.g., latitude, longitude, and altitude information) of the compacting machine 10. The location of the machine 10 can, over time, be used to construct a map of where the machine has traveled. For example, in embodiments, the geolocation unit comprises a Global Positioning System (GPS) receiver. The stored position information and/or map generated by the control module 28 can be used to control the third and fourth projectors 102, 103 to direct lighting indicia in a direction that indicates a previously compacted work area or lane. The indicia thus directed by one or both of third and fourth projectors 102, 103 can be superimposed over indicia generated by the first and/or second projectors 100, 101 so the operator can visually determine if the machine 10 is properly positioned, for example, by producing a desired overlap of a current work lane with a previous and adjacent work lane.

In other embodiments, the geolocation unit can comprise a portion of an Inertial Reference System (IRS), a local tracking system, or another known locating system that receives or determines positional information associated with the compacting machine 10. Suitable technologies for geolocation include, but are not limited to, the U.S. Global Positioning System, the Russian GLONASS satellite-based system, the European Galileo satellite-based system, and radio-positioning systems provided by Locata Corporation of Canberra, Australia, for example. In embodiments, the geolocation unit can be configured to receive and process geolocation signals from multiple systems to generate the location data used by the machine 10.

In some embodiments, the location data acquired by the geolocation unit can be conveyed to a remotely located central station via the communication device 110 to convey signals indicative of the received or determined positional information of the compacting machine 10 for further processing by a remote operator. The remote operator of the compacting machine 10 can control the second and third projectors 102, 103 based on the determined geolocation signal. Control commands may be issued through the communication device 110 or any other suitable communication network as is known in the art. The controller 104 uses the determined geolocation signal to control the second and third projectors 102, 103.

Figure 2:
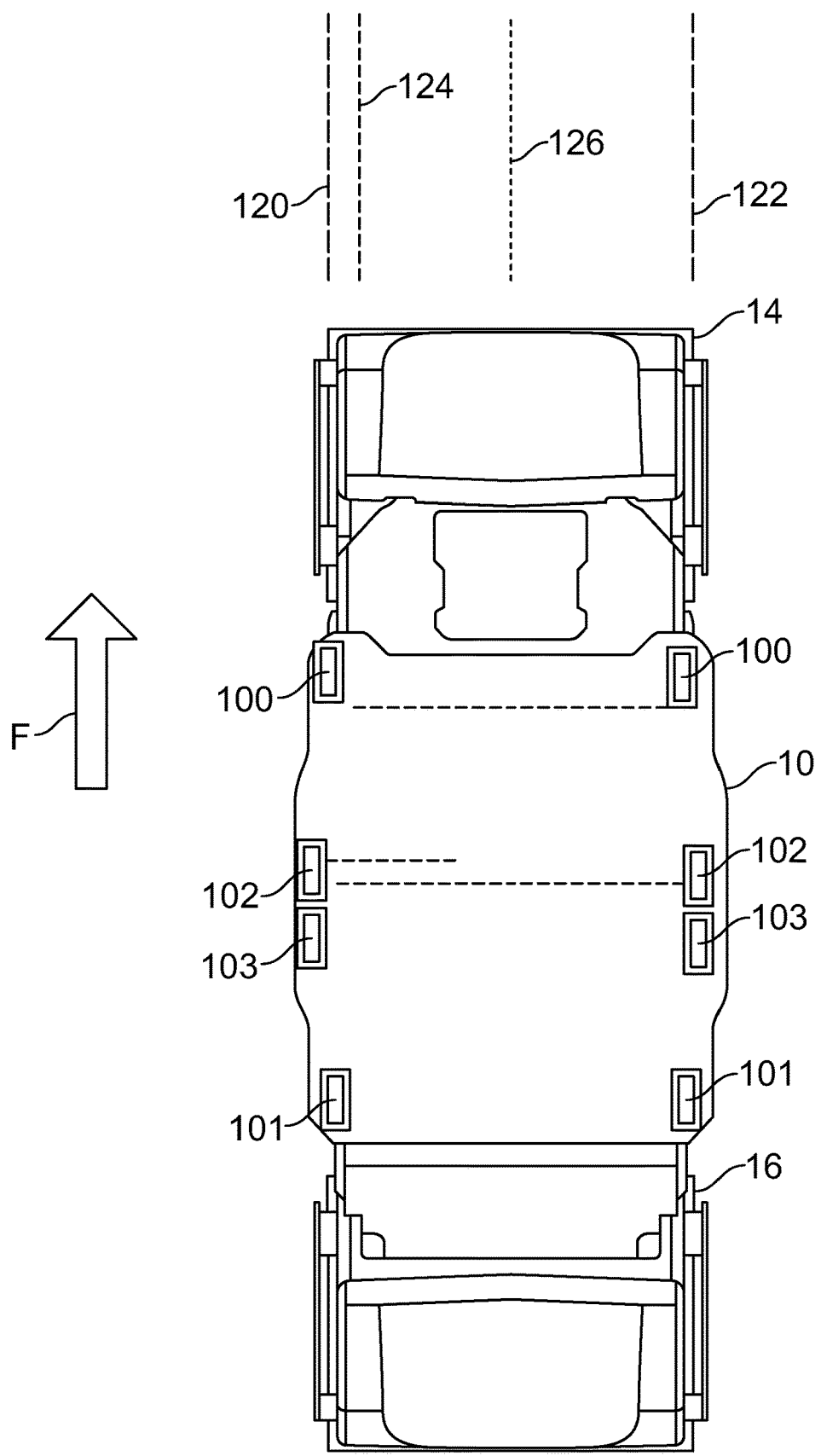
FIG. 2 is a top view of the machine of FIG. 1 showing guidance indicia.

Turning to FIG. 2, an embodiment of a machine 10 is depicted with the above-detailed projectors 100, 101, 102, 103 configured to generate guidance indicia. For context, the forward direction is indicated, via the arrow F, in the figure.

In one embodiment, the guidance system 25 activates the first projector 100, which may be a pair of spaced apart lighting units, to provide a pair of spaced apart forward visual indicia 120, 122 onto the ground. The pair of spaced apart indicia 120, 122 are aligned longitudinally with outer edges of the front compacting member 14 and together define outer boundaries of the current work area corresponding to the ground engaging surface 45 of a compacting member 14. The indicia 120, 122 are respectively generated by left and right-side lighting units in this embodiment. While the machine 10 is moving in the forward direction, the operator can observe the indicia 120, 122 and can see a span of area defined between the indicia where the compacting member 14 will currently compact the surface. In addition to or as an alternative embodiment, the projector 100 can be configured to display indicia 126 indicative of a centerline of the machine 10. Indicia, in this embodiment, includes projected light bars or lines or the like projected upon the work surface by the light projectors.

As detailed above, the guidance system 25, which has stored position data representing an area upon which the machine 10 has previously performed compaction, may activate the third projector 102 to indicate a boundary of the previously worked area adjacent to the current position of the machine. The boundary is indicated as a visual indicia 124 projected by the third projector 102 in the direction of travel, which, in the present example is generally forward. When indicia 124 is projected and observed between indicia 120 and 122, the operator understands that the machine is oriented to provide an overlap between the previous work area or lane and the area to be worked corresponding to the amount of overlap between indicia 120 and 124 in this example. An analogous method, when the machine is operated in a reverse direction, can be performed by the system 25 through activation of projectors 101 and 103.

Figure 3A:
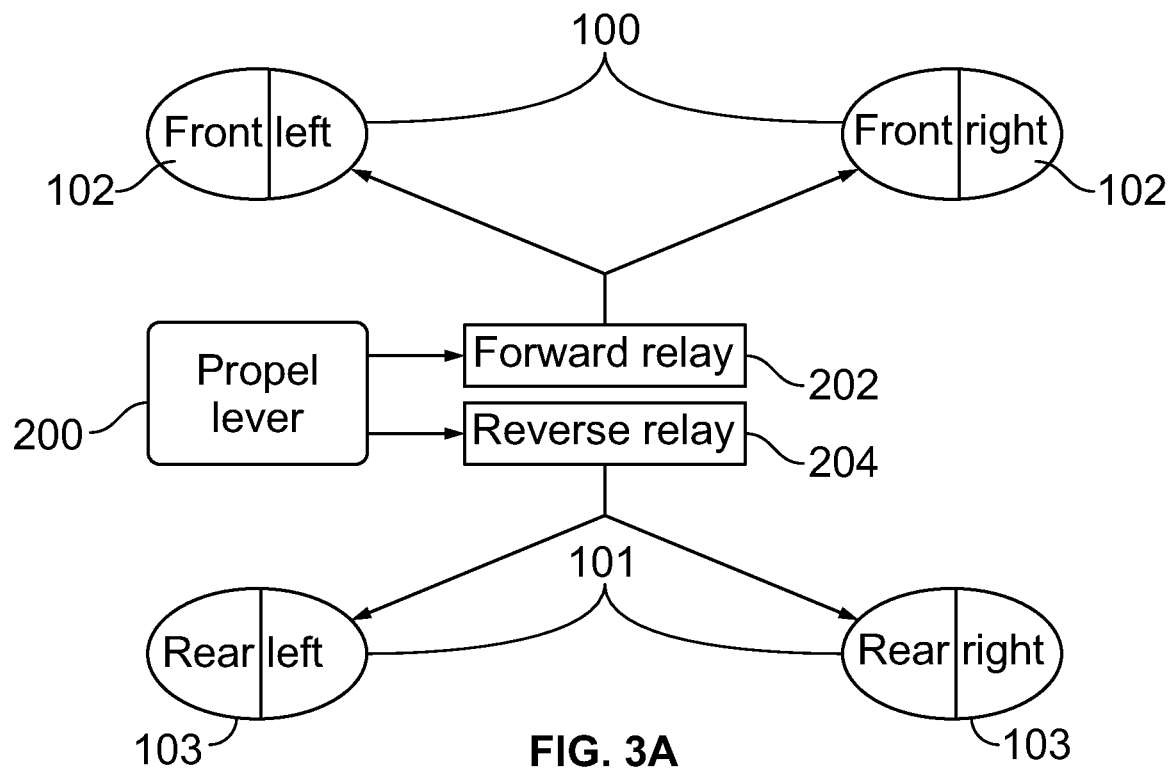
FIGS. 3A and 3B are general schematics of aspects of a guidance system according to two embodiments of the disclosure.

FIG. 3A illustrates one embodiment of the disclosure, wherein the guidance system 25 is configured to detect the direction of operation of the machine 10 and responsively project indicia in the direction of travel. One way the system 25 detects the operating direction is by detecting whether a propel lever 200 of the operator controls 52 (FIG. 1) is engaged with a forward relay 202 or a reverse relay 204.

Depending on the detected state of engagement, the guidance system 25 can activate the first projectors 100 or both the first projectors and the third projectors 102 when the machine is being operated in the forward direction. Similarly, the guidance system 25 can activate the second projectors 101 or both the second projectors and the fourth projectors 103 when the machine is being operated in the reverse direction. It will be understood that the methods disclosed herein may be performed in a direction corresponding to the direction of travel of the machine 10.

Figure 3B:
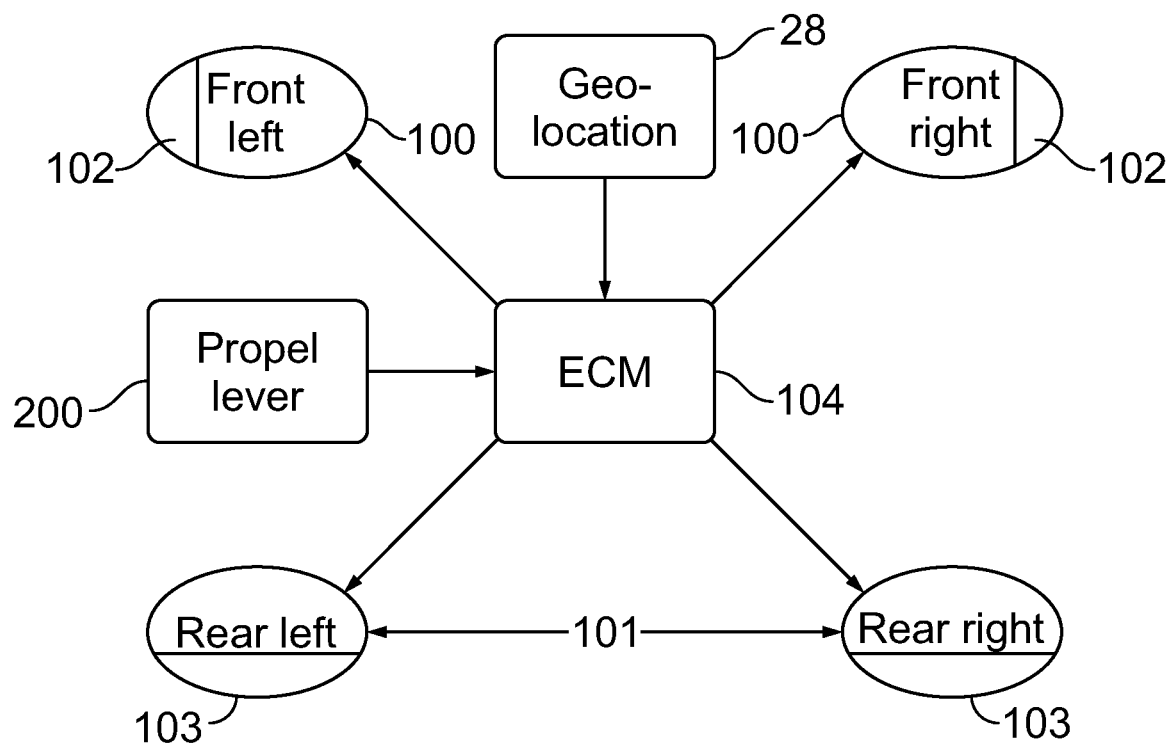

FIG. 3B illustrates another embodiment of the disclosure, wherein the guidance system 25 is configured to detect the direction of operation of the machine 10 and responsively project indicia in the direction of travel. As in the above embodiment, the operating direction is by detecting whether a propel lever 200 of the operator controls 52 (FIG. 1) is engaged with a forward relay or a reverse relay. Depending on the detected state of engagement, the controller 104 of the guidance system 25 can activate the first projectors 100 or both the first projectors and the third projectors 102 when the machine is being operated in the forward direction. Similarly, the controller 104 of the guidance system 25 can activate the second projectors 101 or both the second projectors and the fourth projectors 103 when the machine is being operated in the reverse direction. It will be understood that the methods disclosed herein may be performed in a direction corresponding to the direction of travel of the machine 10. The controller 104 uses position information from the geolocation unit control module 28 to direct the position of the projectors 102 or 103 to generate visual indicia corresponding to the area previously compacted so that the operator can determine whether the machine 10 is being operated in compliance or out of compliance with a desired overlap, for example.

Figure 4:
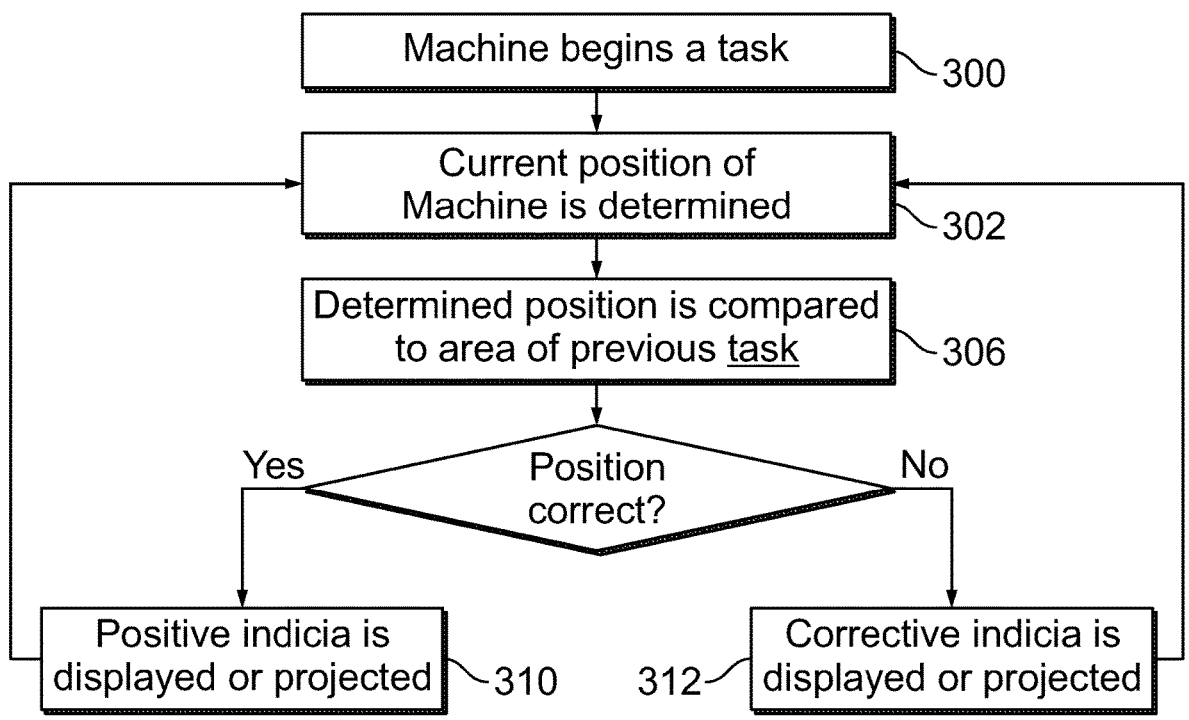
FIG. 4 is a method of operating a machine with a guidance system according to the disclosure.

With the system shown in FIGS. 1 and 2 a number of embodiments can be employed. For example, the guidance system 25 can use one or more of color and lighted indicia to indicate the operational state (in compliance or out of compliance) of the machine 10. For example, and referring to FIG. 4, an operator begins a task 300, such as compacting a work area, by starting the machine and performing a first pass to compact a first portion of the work area. During the first pass, the guidance system 25 acquires position information of the machine 10 in step 302. The position information may be used to create a position map which is stored in the module 28 or the guidance system 25. When the operator begins a second pass to compact a second portion of the work area, adjacent the first portion, the guidance system 25 may determine that the operator is operating the machine 10 on a path adjacent the first work area by comparing the current position of the machine to the stored first work area in step 306. When the guidance system 25 determines that the position of the machine 10 is in compliance with operational guidelines for proper compaction, the system displays to the operator or projects upon the work surface indicia indicating compliance in step 310. Alternatively, when the guidance system 25 determines that the position of the machine 10 is out of compliance with operational guidelines for proper compaction, the system displays to the operator or projects upon the work surface indicia indicating non-compliance in step 312. The system 25 returns to step 302 while the machine 10 is in operation. Alternatively, the guidance system 25 does not perform any comparison step and only projects indicia corresponding to an area or areas that have previously been compacted. The operator can compare whether the indicia projected by the current projectors 100 or 101 with the projected indicia corresponding to the previously compacted area to determine whether the machine 10 is being operated properly and can take corrective action to overlap indicia an amount corresponding to the desired overlap.

The indication of compliance or non-compliance may take different forms, some of which have been discussed above. Referring also to FIG. 2, in an additional embodiment, when in compliance, the system 25 may cause projectors 100 to project one or more of the green lines 120, 122 on the surface in a direction of travel. When the machine 10 is operating in a position that is left of a compliant position, the system 25 may cause projectors 100 to project a red line 122 only along the right side of the machine in a direction of travel. When the machine 10 is operating in a position that is right of a compliant position, the system 25 may cause projectors 100 to project a red line 120 only along the left side of the machine in a direction of travel. When the operator detects a non-compliant condition, the operator corrects the direction of the operation of the machine 10 toward the red line until both lines 120, 122 are displayed in green by the guidance system 25. Alternatively, in addition to or in place of red or green lines, the system 25 can generate similar displays to the operator in the operator compartment 18.

In another embodiment, when in compliance, the system 25 may cause projectors 100 to project a green line 126 along a centerline of the machine in the direction of travel onto the work surface. When the machine 10 is operating in a position that is left of a compliant position, the system 25 may cause projectors 102 to project a red line 122 only along the right side of the machine in a direction of travel. When the machine 10 is operating in a position that is right of a compliant position, the system 25 may cause projectors 102 to project a red line 120 only along the left side of the machine in a direction of travel. When the operator detects a non-compliant condition, they divert the direction of the operation of the machine 10 toward the red line until both lines are turned off by the guidance system 25. Alternatively, in place of or in addition to red lines projected onto the work surface, the system 25 can generate similar displays to the operator in the operator compartment 18. As noted above, other machines can be equipped with a guidance system 25 according to one or more of the above embodiments where it would be beneficial to provide visual guidance to an operator in machinery where it is not possible to observe the position of tools or other aspects of the machine in operation.

INDUSTRIAL APPLICABILITY

The industrial applicability of the system described herein will be readily appreciated from the forgoing discussion. The foregoing discussion is applicable to machines that operate over a work area or have implements where it would be beneficial to provide visual positional guidance to the operator.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of operating a compacting machine on a work area, comprising:
   performing, with the compacting machine, a first pass to compact a first portion of the work area;
   compacting, on the first pass, a first compacted lane;
   acquiring, with a guidance system, position information of the machine representing the first compacted lane;
   performing a second pass to compact a second portion of the work area adjacent the first portion;
   acquiring, with the guidance system, current position information of the machine representing current positioning of the machine during the second pass;
   determining, by comparing the position information of the machine representing the first compacted lane with the current position information, whether the current positioning overlaps the first compacted lane a specified amount;
   when the second pass is determined to overlap the first compacted lane with the specified amount, generating a visual indicia of an in-compliance condition; and
   when the second pass is determined to not overlap the first compacted lane with the specified amount, generating a visual indicia of an out of compliance condition.

2. The method of claim 1 wherein the visual indicia includes a lighted line projected upon the work area.

3. The method of claim 2 wherein the lighted line represents a boundary of the first compacted lane.

4. The method of claim 3 wherein the visual indicia includes a lighted line projected upon the work area that represents a boundary of the second portion of the work area.

5. The method of claim 4 wherein the visual indicia includes color indication whether the compacting machine is operating in the in-compliance condition or the out of compliance condition.

6. A compacting machine configured to compact a material on a surface, the compacting machine comprising:
   a frame;
   a compacting member mounted to the frame, the compacting member configured to compact the material to produce a compacted area;
   a projector arranged on the frame, the projector configured to generate position indicia during operation of the machine, the position indicia indicative of a work area currently being compacted by the compacting member;
   a guidance system supported on the frame comprising:
   a geolocation unit configured, during operation of the compacting machine, to acquire current position of the compacting machine over time and store the position information, wherein the stored position information is representative of a previously compacted work area; and
   a controller in communication with the geolocation unit, wherein the controller is configured to generate visual indicia indicative of an in-compliance condition when the previously compacted work area overlaps a specified amount with the current position and an out of compliance condition when the previously compacted work area fails to overlap a specified amount with the current position.

7. The compacting machine of claim 6 comprising a first projector configured to generate position indicia forwardly and a second projector configured to generate position indicia rearwardly.

8. The compacting machine of claim 7 wherein the first projector is a pair of projectors and the second projector is a pair of projectors, each of the pair of projectors configured to indicate a respective one of the outer edges of the compacting member.

9. The compacting machine of claim 8 configured to sense a direction of travel of the machine and responsively configured to activate the first projector when the machine is traveling forwardly and activate the second projector when the machine is traveling in reverse.

10. The compacting machine of claim 6 wherein the visual indicia is displayed by an interface disposed in an operator compartment of the compacting machine.

11. The compacting machine of claim 6, further comprising:
    a further projector arranged on the frame, the further projector in communication with the controller; and
    wherein the controller is configured to generate the visual indicia via the further projector.

12. The compacting machine of claim 11 wherein the visual indicia is one or both of light lines and color light lines projected upon the surface.

13. The compacting machine of claim 12 wherein the position indicia indicative of a work area currently being compacted by the compacting member includes a light line projected onto a centerline of the compacting machine.

14. The compacting machine of claim 12 wherein the position indicia indicative of a work area currently being compacted by a compacting member includes a single light line projected onto the surface along an edge of the compacting member closest to the previously compacted work area.

15. The compacting machine of claim 12 wherein the position indicia indicative of a work area currently being compacted by the compacting member includes a pair of spaced apart light lines projected onto the surface, one of the pair of light lines projected along one edge of the compacting member and another of the pair of light lines projected along the other edge of the compacting member.

16. The compacting machine of claim 15 wherein the visual indicia projected by further projector includes a light line defining an edge of the previously compacted work area immediately adjacent the work area currently being compacted by the compacting member.

17. The compacting machine of claim 16 wherein the controller is configured to generate, with the further projector, a light line of a selected color indicative of the in-compliance condition, when the work area currently being compacted by the compacting member overlaps the edge of the previously compacted work area a specified amount.

18. The compacting machine of claim 16 wherein the controller is configured to generate, with the further projector, a light line of a selected color indicative of the out of compliance condition, when the work area currently being compacted by the compacting member fails to overlap the edge of the previously compacted work area a specified amount.

19. A machine comprising:
an implement configured to complete a task, wherein the implement is not directly observable by an operator during operation of the machine; and
a guidance system configured to project visual indicia corresponding to a location of the implement, wherein the visual indicia is observable by the operator during operation of the machine;
wherein the guidance system further comprises:
a geolocation unit configured, during operation of the machine, to acquire current position of the machine over time and store the position information, wherein the stored position information is representative of a previous work area; and
a controller in communication with the geolocation unit, wherein the controller is configured to generated wherein the controller is configured to compare the current position information with the store position information and to generate the visual indicia is indicative of an in-compliance condition when the current position partially overlaps with the stored position information or an out of compliance condition of the implement when the current position information does not overlap with the stored position information.

* * * * *